Oct. 17, 1967  E. S. TAMM  3,348,000
LIQUID CONDUCTOR TYPE ELECTRIC SWITCH
Filed Oct. 13, 1965
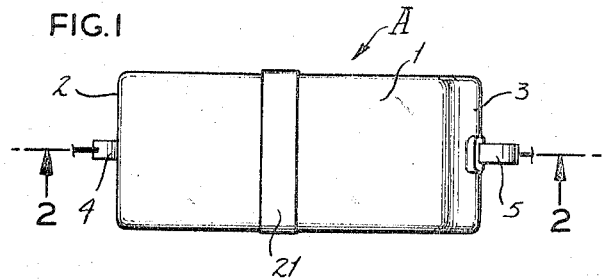
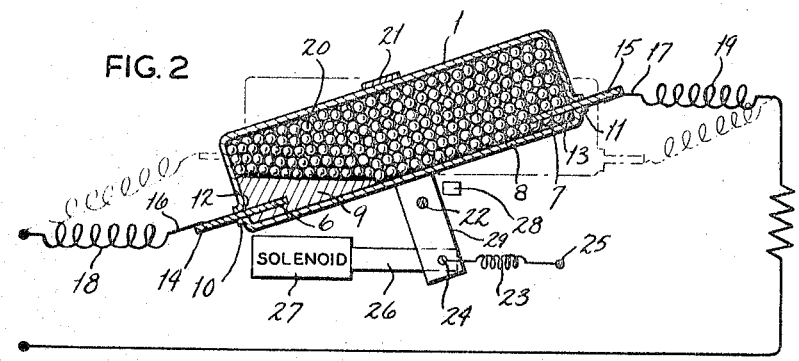
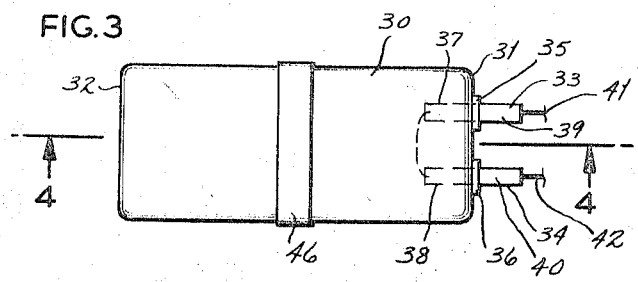
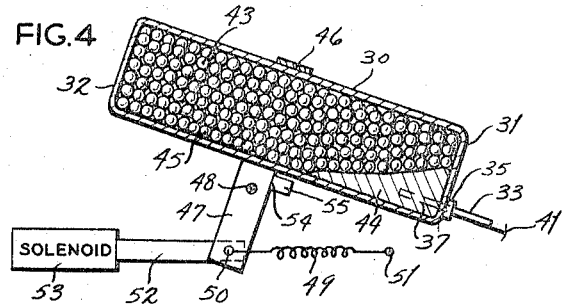
INVENTOR
EMIL S. TAMM
BY
ATTORNEY United States Patent Office 3,348,000
Patented Oct. 17, 1967

3,348,000
LIQUID CONDUCTOR TYPE ELECTRIC SWITCH
Emil S. Tamm, Fort Smith, Ark., assignor to Baldor Electric Company, Fort Smith, Ark., a corporation of Missouri.
Filed Oct. 13, 1965, Ser. No. 495,497
9 Claims. (Cl. 200—33)

ABSTRACT OF THE DISCLOSURE

Electrical switch of the tiltable type in which the circuit is completed through liquid conductor, and wherein the enclosure for the liquid conductor is packed with glass globules to impede the flow of the liquid conductor toward and away from the electrode.

---

This invention relates in general to electrical circuit control, and more particularly, pertains to an electric switch having time delaying components which prevent an immediate operation upon its actuation.

It is an object of this invention to provide a novel electric switch having various characteristics that function to produce a predetermined time delaying action in the electric current conduction after the switch has been initiated into operation.

Prior inventions within the field of electric switches reveal various forms of fabricated switches that, when actuated into operation, provides for rapid electrical conduction and thereby place a circuit into near instantaneous operation. A few of these inventions reveal the use of a conductive material such as mercury which functions in an actuated switch to immediately span the gap between two conductors and thereby provide for current passage. These inventions fail to reveal any structure using a fluid conductor that can achieve a precisely predetermined time lapse between the moment the switch is turned to the "on" position and when electrical conduction is made through its operation. For example, the electric switch of this invention has been found to be very useful in application in providing for a delaying of the transfer of charge into the armature of an electrical motor after the motor has been turned on, so that charge may first be supplied to the stator windings to provide for an initial build up of its electromagnetic field.

Therefore, it is a further object of this invention to provide an electric switch which may be easily inserted into variously designed circuits and therein impart means for controlling and delaying the initial moment of current conduction which is critically important in the operation of present day precision instruments.

It is another object of this invention to provide an electric switch which utilizes a fluid conductor for spanning a fixed spacing between charged circuit electrodes, and wherein the free flowing movement of said conductive fluid in bridging the spacing is partially impeded to prevent an immediate conductivity of charge which results in a time delayed operation of the switch.

It is still another object of this invention to provide an electric switch which is extremely simple and novel in construction and has a useful life for a lengthy duration since it incorporates relatively few mechanically movable parts or mechanical operations which normally expose other switches to reasonably quick deterioration upon continuous usage.

Additional objects and details of this invention will become readily apparent from the following description when read in conjunction with the accompanying drawings (one sheet) wherein:

FIGURE 1 is a top view of the electric switch.

FIGURE 2 is a sectional side view of the electric switch taken on line 2—2 of FIGURE 1 with a fragmentary end section of the obstructing members removed for revealing the conductive fluid, and further is disclosed a view of a hidden line drawing of the switch when leveled;

FIGURE 3 is a top view of a modification of the electric switch; and

FIGURE 4 is a sectional side view of the electric switch taken on line 4—4 of FIGURE 3 with a fragmentary end section of the obstructing members removed for revealing the conductive fluid.

Referring now in detail to the drawings, in FIGURE 1 is shown an electric switch A comprising a hollow enclosure 1 constructed of any sturdy, nonconductive material and which has rigidly secured to its integral sides 2 and 3 a pair of electrically conductive electrodes 4 and 5.

Referring to FIGURE 2, it can readily be seen that enclosure 1 is of a thin shell construction and is void in its interior wherein is retained the various elements that cooperate to provide for the time delay operation of the electric switch upon its actuation. Electrodes 4 and 5 are secured to enclosure 1 proximate the downward edges of its sides, and are arranged so that their integral contact members 6 and 7 are disposed within the interior and slightly upward from the lower surface 8 of said enclosure. It should be noted that there is a slight spacing between the contact members and the lower surface of the enclosure which is provided to allow the maximum exposure of said contact members and thereby enhance their effectiveness as conductors when they are enveloped by an electrically conductive fluid 9. Also, where the electrodes are affixed to the sides of the enclosure, there are provided slight outward flared portions 10 and 11 so that the electrodes are thoroughly supported, and to further provide more freely exposed conduction areas of the contact members, such as at 12 and 13. Electrical circuit connecting members 14 and 15 of the electrodes are disposed for extending exteriorly of the enclosure and are sufficiently exposed so that may be rapidly incorporated within any given circuit and attached to circuit lines 16 and 17, respectively, by means of any common welding, soldering, or other process. Included within said circuit lines are common pigtails 18 and 19 which provide for expansion or contraction of the circuit lines as when the electric switch is motivated into pivotal movement.

Provided within the void interior of enclosure 1 is a plurality of obstructing members 20 which may be constructed of glass, plastic, or any other dielectric, nonconductive material, and material which is nonwettable by the conductive fluid. These obstructing members may be manufactured to any size or shape as has been precalculated to give a precise time delayed hindrance against the rapid free flowing movement of the conductive fluid 9. Preferably, the obstructing members 20 of this invention are globules or are spherical glass beads, and a sufficient number of said members are disposed within enclosure 1 so as to either partially or totally fill is hollow interior, or they may even be compacted therein so as to prevent their shifting. The conductive fluid 9 may be mercury, or any other low resistant, charge conveying liquid. A sufficient amount of said conductive fluid is provided within the enclosure so that when said enclosure is affixed in horizontal alignment, the conductive fluid will be aligned level upon the lower surface of said enclosure and surround the contact members 6 and 7 for providing a conduction of electric charge therebetween.

Surrounding the enclosure 1 is a band or clamp 21 which has depending downwardly an integral arm 21. The arm 21 is pivotally mounted upon a pin 22 which may be secured to any other form of a mounting device, not shown, which may be used for retaining the electric switch in a stationary and fixed position. Affixed proximate the downward end of arm 21 is a spring 23 which normally biases the electric switch into a tilted, nonoperative position. The spring 23 is affixed at one end to the arm 21 by means of a fastener 24, and is retained at its other end 25 to the aforementioned mounting device, not shown. Also secured to the arm 21 by means of fastener 24 is a lever 26 which is disposed for shifting movement under the exertion of a force provided by any force exerting means, such as a common solenoid 27. Affixed to the aforementioned mounting device is a stop 28 which is disposed for engaging the side edge 29 of the arm for maintaining the enclosure 1 in horizontal alignment as when the electric switch has been shifted level for operation.

Another embodiment showing a modification of this invention is revealed in FIGURES 3 and 4 wherein is disclosed an enclosure 30 having sides 31 and 32, and which has securely affixed to said side 31 a pair of electrodes 33 and 34. Flared portions 35 and 36 provide a means for stabilizing the electrodes to the enclosure, and further hermetically seal the integral contact members 37 and 38 of the electrodes within said enclosure. These contact members normally extend interiorly of the enclosure, and are further connected integrally with electrical circuit connecting members 39 and 40 which project exteriorly of said enclosure. The connecting members are fastened to circuit lines 41 and 42 when it is desired to insert the electric switch for operation within a total circuit pattern.

Enclosure 30 also contains within its void interior a plurality of obstructing members 43 which are identical in construction to the obstructing members as previously discussed within this application. Further provided within enclosure 30 is an amount of electrically conductive fluid 44 which is disposed for impeded flow along the downward surface 45 of the enclosure after the electric switch has been pivoted into a current conducting position. A sufficient quantity of said conductive fluid is provided within the enclosure 30 so that when the side 31 of said enclosure is canted downwardly, the conductive fluid will totally surround the contact members 37 and 38, and thereby provide a means for conducting electric charge therebetween.

Securely affixed to the enclosure 30 is a band or clamp 46 which has extending downwardly therefrom an integral arm 47. The arm is mounted upon a pin 48 and is thereon retained for pivotal movement. Affixed proximately to the downward end of the arm is a spring 49 which is secured at one end to said arm by a fastener 50, and is retained at its other end 51 to a mounting device, not shown. Also, attached to the downward end of said arm 47 is a lever 52 which may be actuated into lateral movement by a solenoid 53. When it is desired to maintain the electric switch in an operative, current conducting position, the solenoid and associated lever will pivot the enclosure and its attached arm until the side edge 54 of said arm rests upon stop 55 for maintaining said enclosure slightly tilted having its side 31 oriented downwardly, thereby providing for an accumulation of the conductive fluid proximate this side and surrounding the contact members 37 and 38.

To incorporate the electric switch into operation within an existing circuit pattern, one need only attach the connecting members of the electrodes to the circuit lines. As revealed in FIGURE 2, the electric switch when retained in its inoperative position is disposed slightly inclined with its left side 2 being tilted downward from the normally level horizontal plane. The electric switch will be retained in this manner when the solenoid 27 is not energized and the bias of spring 23 forces the enclosure and arm to pivot into this tilted nonoperative position. In this manner, the conductive fluid will be collected within the lowermost left side depression of the enclosure, and consequently, only surround and remain in contact with the contact member 6 of electrode 4. Since contact member 7 of electrode 5 will be elevated upward from the normal horizontal plane, no conductive fluid will be in contact with this electrode, and hence, no electric charge can be conducted through the switch. When it is desired to move the electric switch into a closed-circuit position, one need simply to energize by electrical means the solenoid 27 which will retract by means of electromagnetic force the lever 26 and thereby pivot the enclosure and arm in a clockwise movement until said enclosure achieves a horizontal alignment and is maintained in said position by means of the stop 28. As the enclosure pivots towards horizontal alignment, the conductive fluid 9 will simultaneously commence to flow under the attraction of gravitational force and spread evenly along a lower surface of the enclosure. The free flowing movement of the conductive fluid will be hindered by the obstructing members as provided within the enclosure. It has been found that as the diameter of the obstructing members contained within the enclosure is increased in dimension, the time delay effected during the impeded flow of the conductive fluid will be lessened. Contrarily, as the diameter of the obstructing members is decreased in size, the time delay caused by the inhibited flow of the conductive fluid after actuation of the switch until current conduction is required increases. It can be seen that the time delayed operation of the switch is directly related to the diameter size of the obstructing members, so that any switch may be constructed having a predetermined time delayed operation and be included within any precision instrument which must perform under extreme accuracy. To move the electric switch into an open-circuit position, one need simply to de-energize the solenoid 27 so that the enclosure 1 may be pivoted under the bias of spring 23 into a counterclockwise movement until the left side of said enclosure is retained downward upon an incline. The extension of the lever 26 regulates the amount of pivotal movement made by the enclosure when shifting into a circuit breaking incline position, and the lever may also act in conjunction with the solenoid to retain the enclosure disposed in a horizontal current conducting position as when pivoted into operation. As the pivotal movement of the enclosure into a circuit breaking position commences, the conductive fluid will immediately start to reflow by the obstructing members to the left side depression and break off contact with the electrode 5. When maintained in this position, the electric switch will not provide for any current conduction through the circuit in which it is included. The electric switch will remain in this nonoperative position until the solenoid once again is energized to provide for pivoting of the enclosure.

The operation of the modification of the electric switch as revealed in FIGURES 3 and 4 is very similar to the operation of the switch previously discussed, so that when the switch is mantained nonconducting and in open-circuit, its left side 32 will be canted downwardly and the conducitve fluid thereby gravitationally retained proximate this area. In this position, no conductive fluid will span and provide electrical connection between the contact members 37 and 38 of the electrodes, and therefore, no electrical current will be conveyed therebetween. When the solenoid 53 is energized, the electric switch will be forced into a clockwise pivotal movement until the edge 54 of arm 47 engages with the stop 55. As the electric switch is being shifted under the operation of the solenoid, it will be pivoted until the side 31 of the enclosure is inclined downwardly, at which time the conductive fluid will flow along an incline towards the lower right end area of the enclosure and therein envelope the contact members 37 and 38 of the electrodes, thus providing electrical connection between said electrodes. Naturally, as the conductive fluid flows towards the electrodes, its rapid movement is impeded by the obstructing members 43 contained within the enclosure. This restrained movement effects the time delay between the moment the switch is pivoted until it commences to convey an electric charge. When it is desired to end the electric conduction provided by the switch, it is only necessary to de-energize the solenoid which allows the enclosure to pivot under the bias of spring 49 until the enclosure is retained with its left side 32 canted downwardly, at which time, the conductive fluid will flow downwardly along an incline to the lower left side depression away from the contact members 37 and 38 of the electrodes.

It is to be understood that the above described details and arrangements of the various parts of the invention are simply illustrative of the application of the principles of the invention. Numerous other arrangements may be readily devised by those skilled in the art which will embody the principles of the invention and fall within the spirit and scope thereof.

Having thus described the invention, what is claimed and desired to be secured by Letters Patent is:

1. An electric switch comprising a pivotally mounted enclosure, a pair of electrodes secured to said enclosure, a multiplicity of freely movable obstructing members contained within said enclosure, and a conductive fluid disposed for impeded flowing within said enclosure for providing electrical conduction between said electrodes when said enclosure is pivoted into operative position.

2. An electric switch comprising an enclosure having integral sides and a lower surface, a pair of electrodes secured to the sides of said enclosure and extending partially interiorly thereof, said interiorly extending portion of said electrodes being spaced upward from the lower surface of said enclosure, a conductive fluid disposed within said enclosure, and a multitude of substantially spherical obstructing members contained within said enclosure for impeding the flowing movement of said conductive fluid toward and away from electrically conductive relationship between said electrodes.

3. An electric switch comprising a tiltable enclosure of dielectric material, spaced electrodes secured to said enclosure with part of each exposed on the interior thereof, conductive fluid within said enclosure in an amount at least sufficient to bridge the space between said electrodes when the enclosure is at one position, and a multitude of freely movable solid bodies of dielectric material contained within and movable relative to said enclosure.

4. The switch of claim 3 in which said conductive fluid is liquid.

5. The switch of claim 3 in which said solid bodies are substantially spherical.

6. The switch of claim 3 in which said solid bodies have a specific gravity less than said conductive fluid.

7. The switch of claim 3 in which said solid bodies and conductive fluid collectively substantially fill the space within said enclosure.

8. The switch of claim 3 in which said solid bodies have a melting point above that of said conductive fluid.

9. An electric switch comprising a tiltable enclosure of dielectric material, spaced electrodes secured to said enclosure with part of each exposed on the interior thereof, conductive fluid within said enclosure in an amount at least sufficient to bridge the space between said electrodes when the enclosure is at one position, and a multitude of solid bodies of dielectric material being compacted within said enclosure, and said conductive fluid occupying interstices between the adjacent solid bodies.

References Cited

UNITED STATES PATENTS

| | | | |
|---|---|---|---|
| 972,516 | 10/1910 | DeWolf | 335—48 |
| 2,254,710 | 9/1941 | Reid | 200—33 |
| 2,849,550 | 8/1958 | Olmer et al. | 200—33 |
| 3,222,469 | 12/1965 | Morris | 200—33 |

BERNARD A. GILHEANY, *Primary Examiner.*

H. E. SPRINGBORN, *Examiner.*

UNITED STATES PATENT OFFICE
CERTIFICATE OF CORRECTION

Patent No. 3,348,000                      October 17, 1967

Emil S. Tamm

It is hereby certified that error appears in the above numbered patent requiring correction and that the said Letters Patent should read as corrected below.

Column 1, line 16, for "electrode." read -- electrodes. --; line 19, for "electrical" read -- electric --; column 2, line 39, for "exterioly" read -- exteriorly --; line 40, after "that" insert -- they --; line 59, for "is" read -- its --.

Signed and sealed this 12th day of November 1968.

(SEAL)
Attest:

Edward M. Fletcher, Jr.

Attesting Officer

EDWARD J. BRENNER

Commissioner of Patents